March 3, 1931. A. J. WARSAW 1,794,997
PLUG INSERTING IMPLEMENT
Filed July 2, 1927
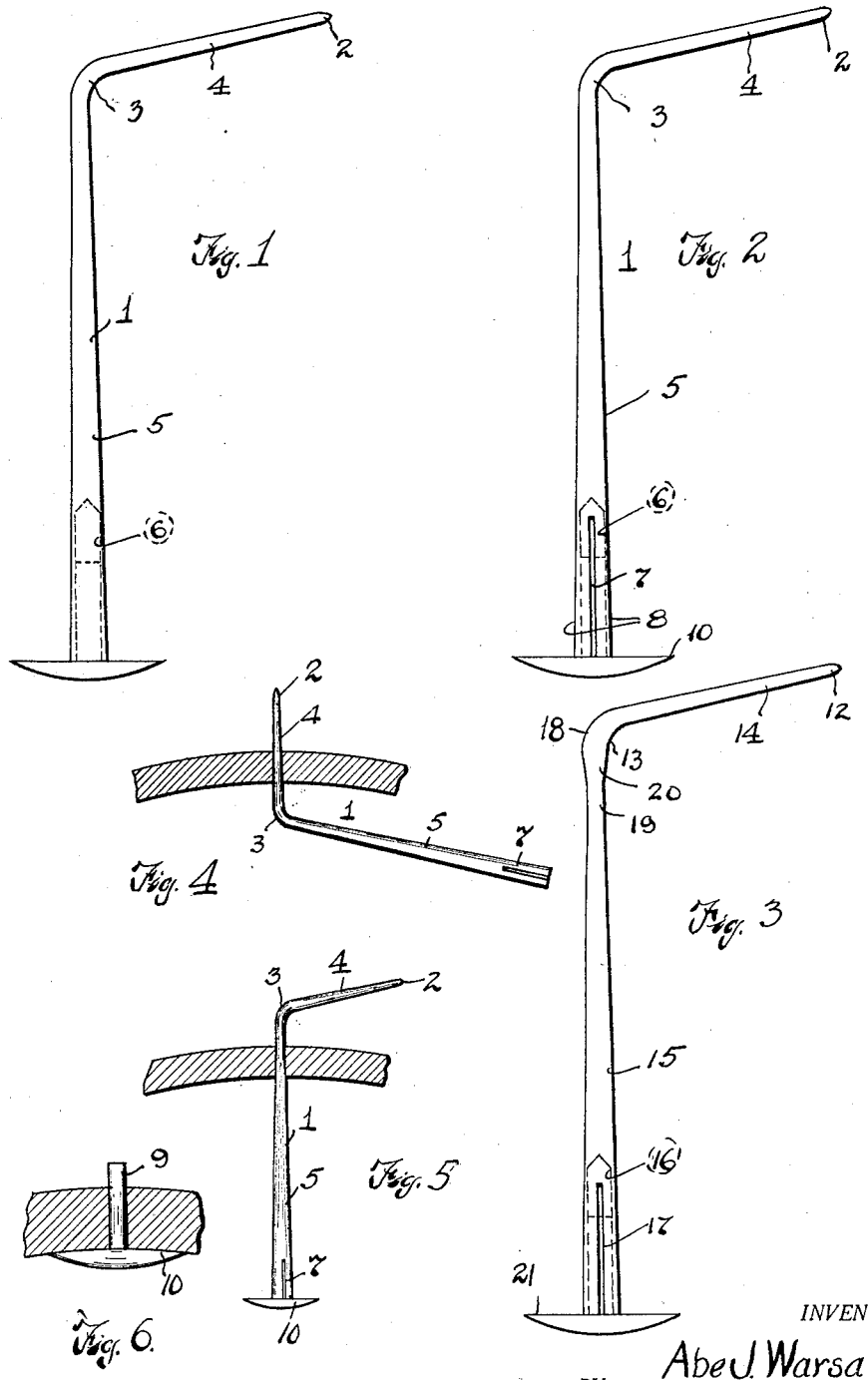
INVENTOR.
Abe J. Warsaw
BY Fay, Oberlin & Fay
ATTORNEYS Patented Mar. 3, 1931

1,794,997

UNITED STATES PATENT OFFICE

ABE J. WARSAW, OF GRAND RAPIDS, MICHIGAN, ASSIGNOR TO KEX COMPANY, INC., OF ST. LOUIS, MISSOURI, A CORPORATION OF MISSOURI

PLUG-INSERTING IMPLEMENT

Application filed July 2, 1927. Serial No. 203,213.

This invention as indicated relates to a plug inserting implement. More particularly it comprises an implement sometimes designated a "needle" provided with means adjacent one end for engagement with the stem of a rubber plug and at its opposite end adapted to be inserted through the puncture hole in a tire casing, said implement having the opposite end portions angularly related to each other so that each of said portions may serve as a handle with reference to the other portion for effecting the proper manipulation of the same and seating the plug stem in the puncture aperture. Instruments have heretofore been provided which have had movable and auxiliary parts for effecting the pulling, pushing or twisting movement of the same, but so far as is known, no single integral implement capable of such manipulation has been heretofore provided. The advantages of an integral implement are manifold including particularly simplicity and economy of manufacture as well as simplicity and improved effectiveness in use.

The principal object of the present invention, therefore, is the provision of improved type of inserting needle for tire casing repair plugs which needle comprises an integral structure having parts which facilitate the handling of said implement without the use of auxiliary parts or the further adjustment of said needle itself.

Another object of the invention is to provide an inserting needle having parts adapted to apply lever action in several directions whereby the insertion of said needle through an aperture or puncture hole may be more readily brought about. Other and further objects of the invention will appear in the course of the following description. To the accomplishment of the foregoing and related ends, said invention, then consists of the means hereinafter fully described and particularly pointed out in the claim.

The annexed drawing and the following description set forth in detail certain structure embodying the invention, such disclosed means constituting, however, but one of various structural forms in which the principle of the invention may be used.

In said annexed drawing:

Fig. 1 is a side elevation of an instrument embodying the principles of my invention; Fig. 2 is a view similar to Fig. 1, but showing a modified form of plug receiving socket; Fig. 3 is a view similar to that of Fig. 2, but showing a modified form of instrument adjacent the angle portion; Figs. 4 and 5 are views illustrating the method of inserting the improved instrument through an aperture in a tire casing; and Fig. 6 is an enlarged detail view showing a tire casing repair plug with its stem engaged within the puncture hole in a tire casing.

As is clearly shown in the drawing, the plug inserting implement or needle comprises a shaft or bar 1, preferably tapering toward one end over all or a part of its length and terminating in a point 2, suitable for insertion through the puncture hole of a tire casing or the like. The other end of the implement is adapted to engage the stem of a puncture plug. At an intermediate point, preferably about one-third of the length of the rod from the point, the implement is provided with a sharp bend 3 bringing the point portion 4, at substantially right angles to the lower portion 5. The extreme end of the implement is preferably provided with a socket 6 which may be of even diameter throughout, thus having thicker side walls adjacent the lower portion, or said socket may be of decreasing diameter in an upward direction, thus having side walls of even thickness. The socket may have a solid unbroken wall surface, as is shown in Fig. 7, but preferably is provided with one or more longitudinal slots, 7, so that it may be varied in size to receive the stem of a repair plug. At least two slots should preferably be formed in the socket walls, as is shown in Figs. 2 to 5, so as to form resilient members or fingers 8 and thus permit the use in a single implement of repair plugs having stems of a variety of sizes and the selection of a plug 10 having a stem 9 of a size suitable for the aperture to be plugged.

In the form of construction illustrated in Fig. 3, the shape of the implement is broadly similar to that illustrated in Fig. 1, having a point 12, at the end of a tapered shaft provided with a sharp bend 13 bringing the point portion 14 substantially at right angles to the lower portion 15 within which a socket 16 is formed, said socket preferably being provided with one or more longitudinal slots 17. The angle portion of the implement is preferably provided with an enlargement 18 on the outer side of the bend 13 and immediately beneath the bent portion of the implement the body of the same is tapered downwardly a short distance and is of substantially uniform diameter over a short length 19 immediately below said downwardly tapered portion 20. The downwardly tapered portion and the adjacent portion of uniform diameter are intended to permit the operator to force the angle portion of the implement a suitable distance above the outer surface of the tire casing with a minimum of resistance until it reaches such position that the fingers of the operator may be engaged beneath the same. The head portion of the rubber plug 21 to be inserted in the casing forms a pad for the hand of the operator to assist in this portion of the operation. The lower portion of the implement is preferably formed of progressively increasing diameter throughout, from the portion of even diameter to the base of the implement.

It may be found desirable to form a portion of said implement cylindrical either adjacent the lower end or at an intermediate point, the tapered connecting sections being correspondingly varied in accordance with such disposition of the cylindrical portions.

The manipulation of the implement may be carried out in several ways; thus, where a puncture aperture such as a nail hole of medium size is to be repaired, the point of the needle is inserted through the nail hole from the interior of the casing and is forced through said aperture by the operator grasping the socket section of the implement until the bend portion of the implement is pressed against the inner wall of the tire casing, (see Fig. 4). The implement is then rotated in the plane of its two angularly disposed sections in a direction to force the bend of the same from a position inside the tire to a position immediately outside the tire. The implement is then forced through the tire preferably by pressure upon the head of a plug engaged in the socket at the base until the portion adjacent the point is forced above the outer face of the tire a sufficient distance to permit the fingers of the operator to engage beneath the same (see Fig. 5).

The form of construction shown in Fig. 3 permits this movement just described to be made very readily, inasmuch as the downward taper of the implement just beneath the curved section assists in spacing the point portion away from the outer surface of the tire casing. When the point portion has been moved to the position indicated, the operator grasps the same firmly and may readily draw the tapered lower end of the implement through the puncture aperture leaving the stem of the plug tightly gripped between the walls of the puncture opening.

The implement, as stated, may be formed with a cylindrical unslotted socket portion or may be provided with a slot or a plurality of said slots. The number of slots may be varied to suit the character of the work to be accomplished. The sharp edges of the slots tend to engage the projecting fibres of the irregular walls of the puncture aperture and in twisting the needle back and forth, these slots may be used after the manner of a reamer to remove sand and dirt from the puncture hole and smooth out the projecting fibres of the puncture walls so that they will firmly engage the stem of the puncture plug. It is, of course, understood that the stem of the puncture plug is preferably inserted within the resilient socket portion of the implement when the reaming action takes place, and thus provides a resilient reamer which will adjust itself to irregularities or obstructions such as grains of sand adjacent one side of the puncture hole and will not injure the implement or tire casing during the operation of clearing the hole of foreign matter. The implement, if unslotted, is pulled or twisted in such manner as to draw the stem of the plug within the puncture aperture and to hold the same in puncture closing position through the release of the walls of the puncture aperture against said stem as the instrument is withdrawn outwardly from the puncture hole.

When the slotted implement is used, the drawing of the needle outwardly through the aperture in the tire casing, compresses or deforms the stem of the puncture plug and compresses the resilient wall or spring fingers of the socket in the base of the implement as well as spreads the walls of the puncture opening and thereafter as the socket portion of the needle is drawn through the tire casing it progressively releases the walls of the puncture opening and the compressed or deformed stem of the puncture plug into self-conforming interlocking relation so that a seal of maximum effectiveness is provided for the puncture hole.

Other modes of applying the principle of my invention may be employed instead of the one explained, change being made as regards the structure herein disclosed, provided the means stated by the following claim or the equivalent of such stated means be employed.

I therefore particularly point out and distinctly claim as my invention:

A plug inserting implement comprising an integral self-contained, pushing, pulling and twisting device having a point and a plug receiving section at opposite ends and bent at an intermediate point to a substantial angle and provided with an enlargement at the angle portion of said implement, and a section of reduced diameter adjacent said bend on the socket portion of said instrument.

Signed by me this 9th day of June, 1927.

ABE J. WARSAW.